Figure 1:
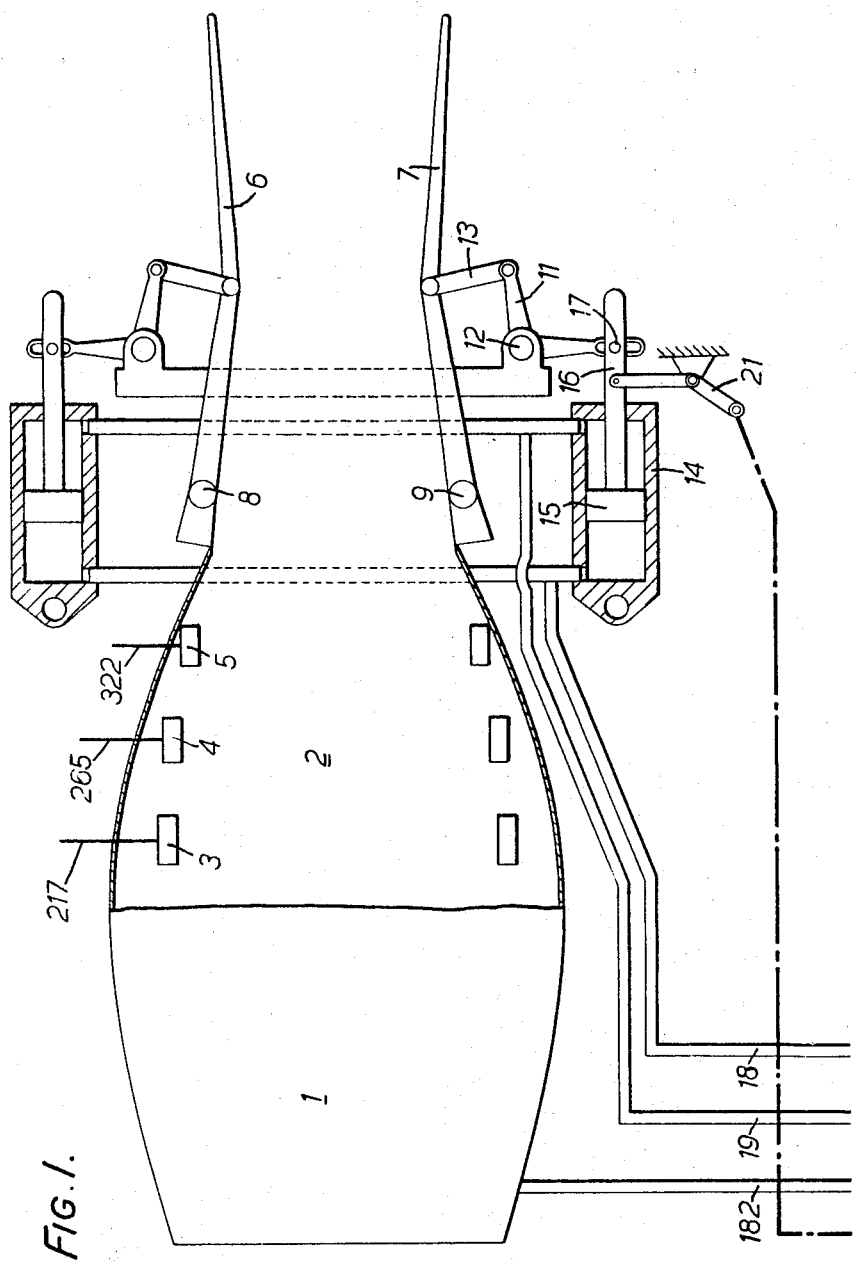

Dec. 27, 1966   D. K. ANDREWS   3,293,857
GAS TURBINE ENGINE
Filed July 28, 1964   10 Sheets-Sheet 1

INVENTOR
DAVID K. ANDREWS

BY Reynolds & Christensen
ATTORNEYS

INVENTOR
DAVID K. ANDREWS
BY Reynolds & Christensen
ATTORNEYS

Dec. 27, 1966  D. K. ANDREWS  3,293,857
GAS TURBINE ENGINE
Filed July 28, 1964  10 Sheets-Sheet 6

INVENTOR
DAVID K. ANDREWS

BY Reynolds & Christensen
ATTORNEYS

INVENTOR
DAVID K. ANDREWS
BY Reynolds & Christensen
ATTORNEYS

Dec. 27, 1966   D. K. ANDREWS   3,293,857
GAS TURBINE ENGINE

Filed July 28, 1964                                           10 Sheets-Sheet 10

INVENTOR
DAVID K. ANDREWS
BY Reynolds + Christensen
ATTORNEYS

United States Patent Office 3,293,857
Patented Dec. 27, 1966

3,293,857
GAS TURBINE ENGINE
David K. Andrews, Cheltenham, England, assignor to Dowty Fuel Systems Limited, Arle Court, near Cheltenham, England, a British company
Filed July 28, 1964, Ser. No. 385,671
Claims priority, application Great Britain, July 30, 1963, 30,212/63
10 Claims. (Cl. 60—237)

This invention relates to a gas turbine engine control system for use with a gas turbine engine having an adjustable area jet efflux nozzle and reheat burners within the engine downstream of the turbine to heat the gases passing through the nozzle.

Where it is required that the reheat thrust augmentation should be varied over a wide range, it is necessary to vary the fuel flow to the combustion system over a wide range. However, the range of fuel/air ratios at which stable combustion can be obtained at any point in the combustion system is restricted, and may be less than the range required to provide the required variation in thrust.

It is therefore normal to provide the required fuel flow range by dividing the combustion system into a number of burner assemblies which may be in the form of segments or circumferential rings in the engine exhaust pipe.

By operating with maximum permissible flow to all burner assemblies when full thrust augmentation is required, and the reducing flow in one burner assembly only to the minimum flow permissible in that burner assembly, shutting down that burner assembly and then repeating successively with the remaining burner assemblies, it is possible to provide a very wide variation in fuel flow (and thrust) without departing from permissible fuel/air ratios in any burner assembly.

The present invention concerns a system for feeding fuel to the burner assemblies of a gas turbine engine so that increase in flow to the various assemblies, they are selected in succession as the maximum flow permissible in previously selected assemblies is reached. When a single manually-operable control is provided for reheat fuel flow control and it is in a position corresponding to maximum fuel flow through one or more burner assemblies, it is very undesirable that a small oscillatory movement of the manual control should be incapable of continually causing initiation and cut-off of fuel flow to the next burner assembly.

In a control system for a gas turbine engine having a variable area jet efflux nozzle and at least two reheat burner assemblies located downstream of the turbine to supply reheat fuel to gas passing through the nozzle, the present invention comprises a manually-operable control for selecting the total fuel flow for the reheat burner assemblies, a nozzle area control responsive to an engine operating condition to adjust nozzle area in the sense to tend to maintain the condition constant, selector valves arranged to feed fuel successivey to the burner assemblies with increase in total fuel flow and to shut-off fuel flow successively from the assemblies with reduction in total fuel flow, and hysteresis means to ensure that the position of the manually-operable control at which fuel starts to flow to a burner assembly during increase in total fuel flow is different from the position of control at which fuel is shut off from the burner assembly during reduction of total fuel flow.

A selector valve may be provided for each assembly and the operating means for each selector valve may comprise a summation device, a first movement means such as a cam arranged to feed a predetermined movement to the summation device when the manually-operable control attains a predetermined position, and a second movement means such as a cam arranged to feed a predetermined movement to the summation device when the nozzle attains a predetermined area, the selector valve being arranged for operation by the summation device to feed fuel to the said assembly only when the two predetermined movements have been fed to the summation device.

The hysteresis means may comprise the arrangement of the second movement means to be capable of feeding a further predetermined movement to the summation device when the nozzle area increases a small amount beyond the area at which the second movement means gives its first predetermined movement to the summation means, the two predetermined movements of the second movement means acting through the summation device being capable on their own of maintaining the selector valve in the condition to feed fuel to the burner assembly.

The summation device may comprise a floating lever.

Figure 2:
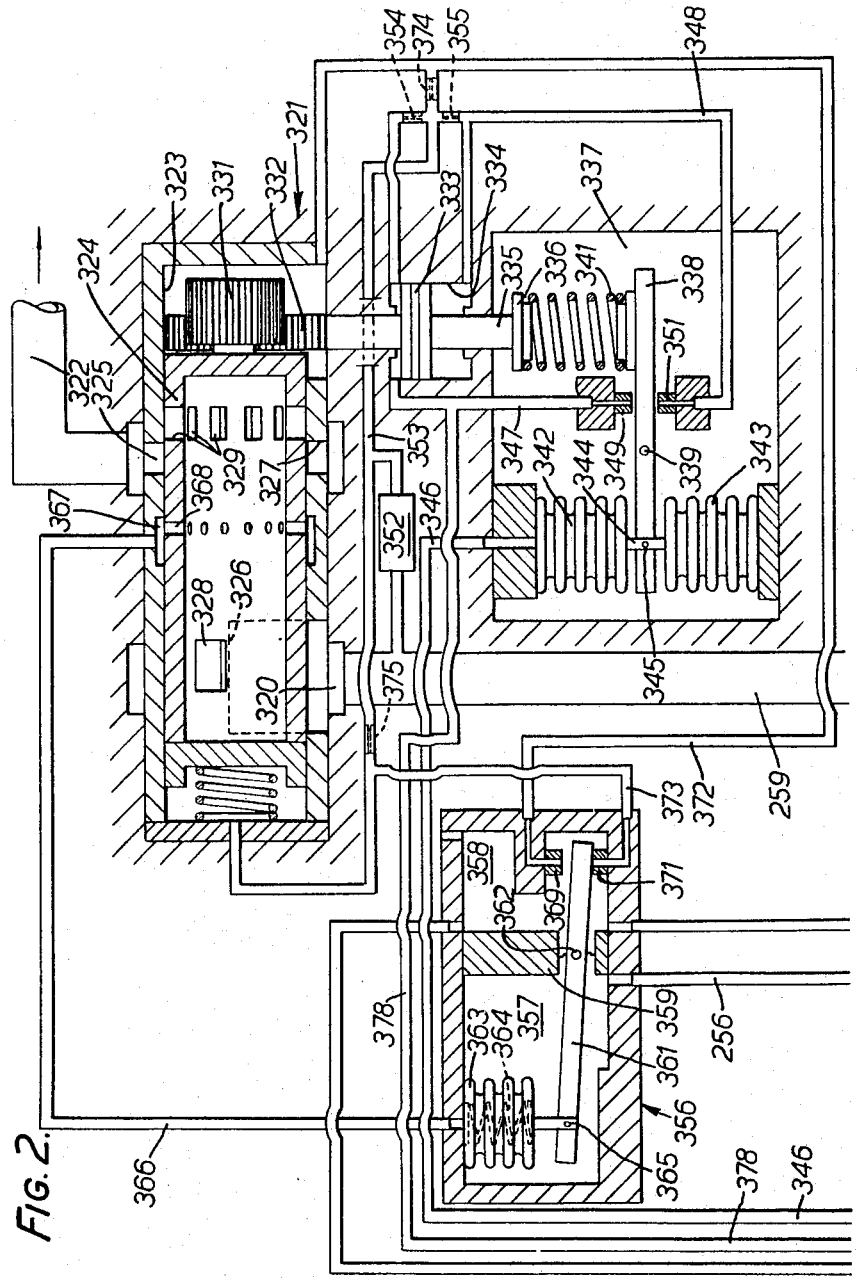
Figure 3:
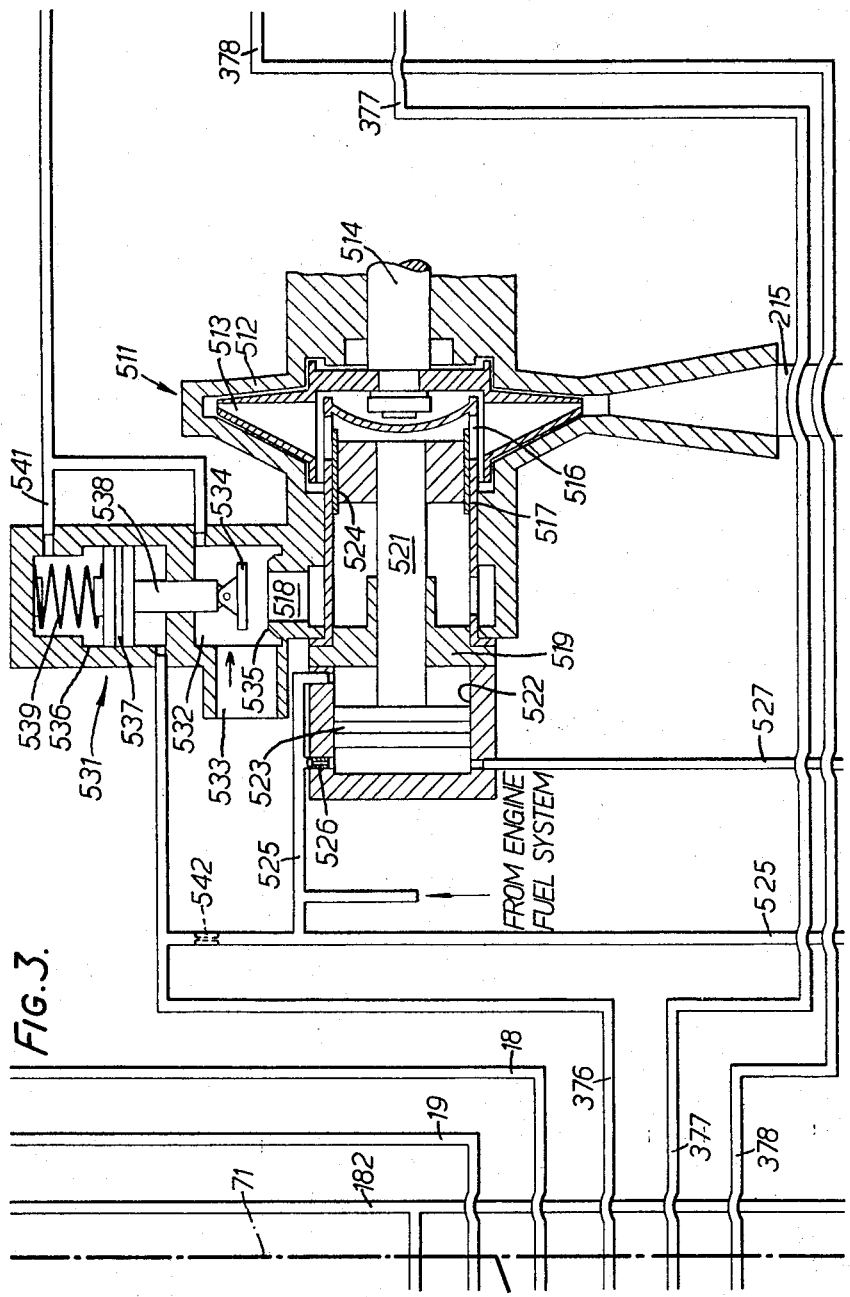
Figure 4:
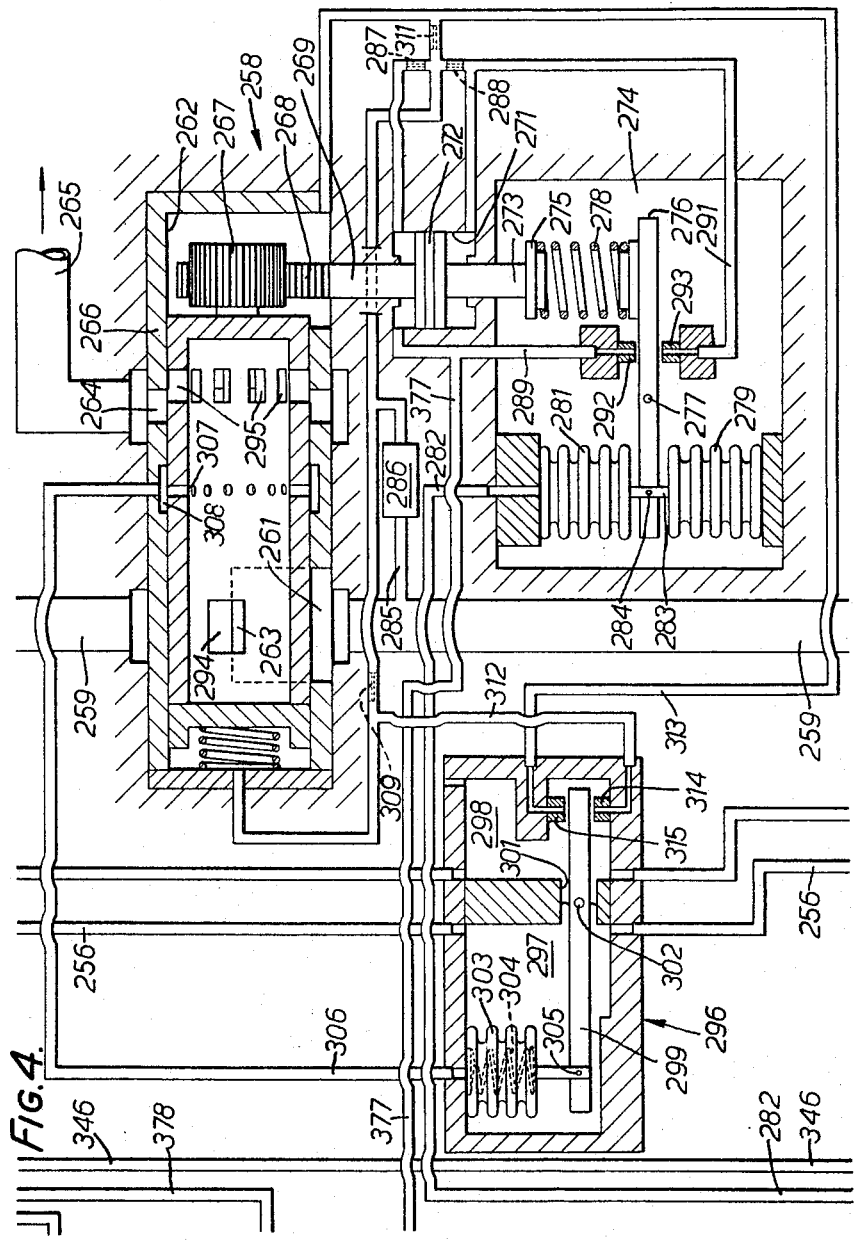
Figure 5:
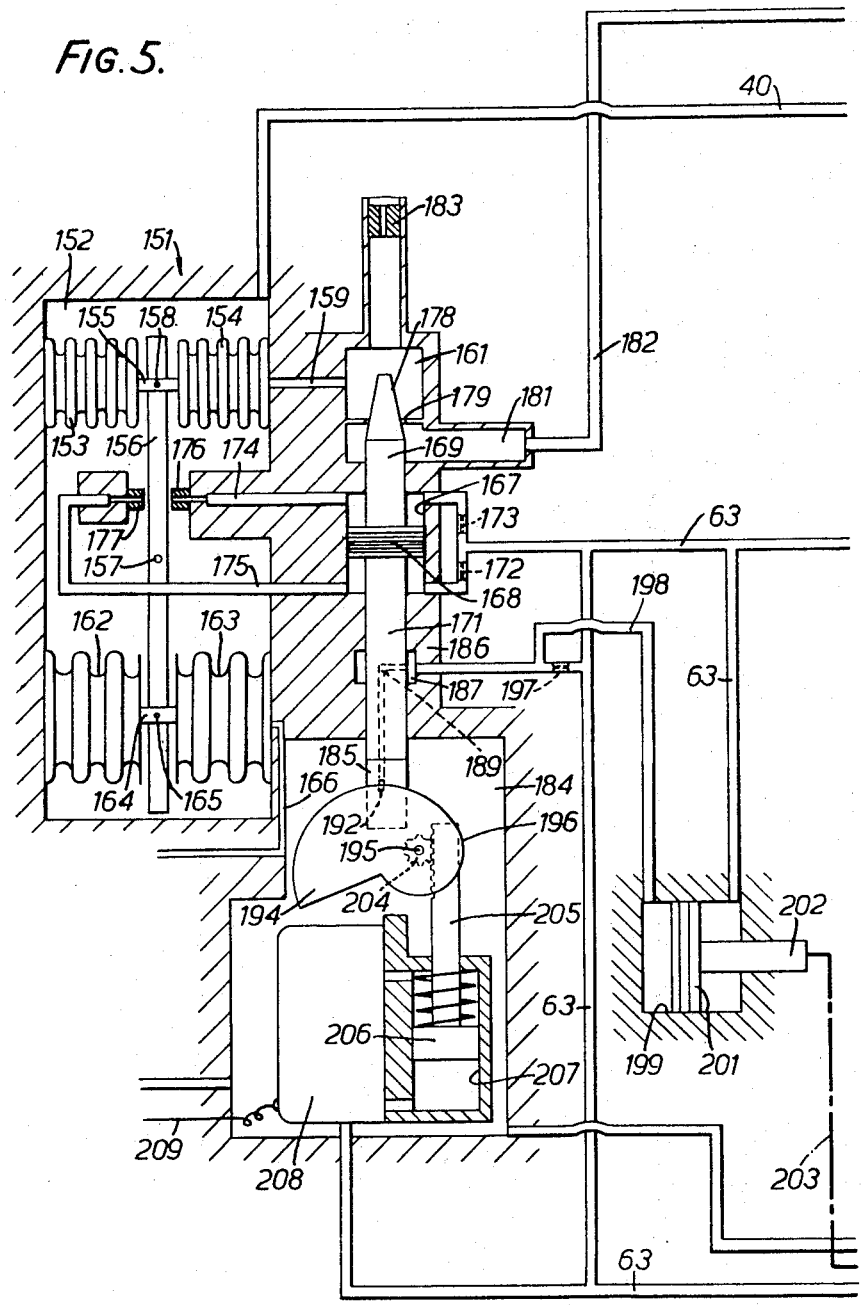
Figure 6:
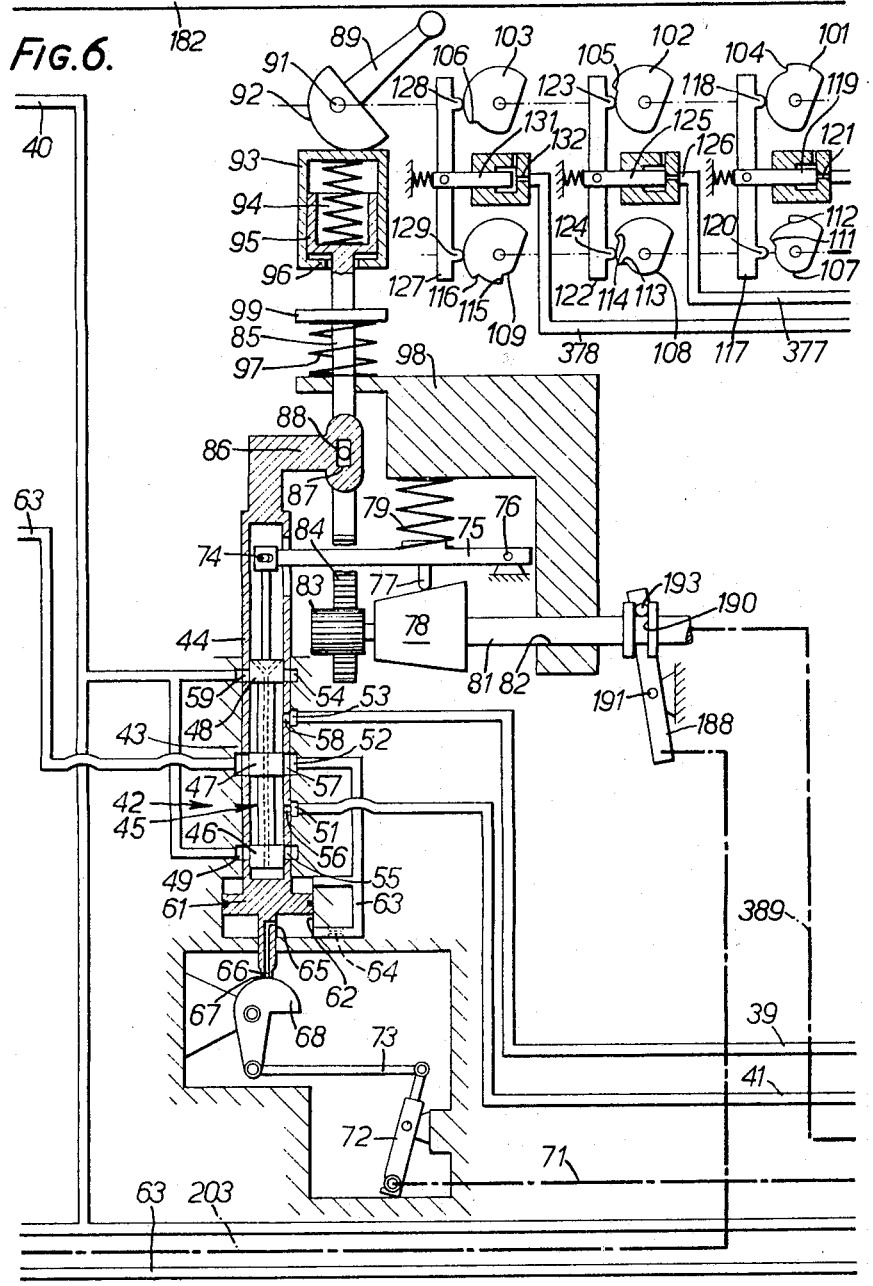
Figure 7:
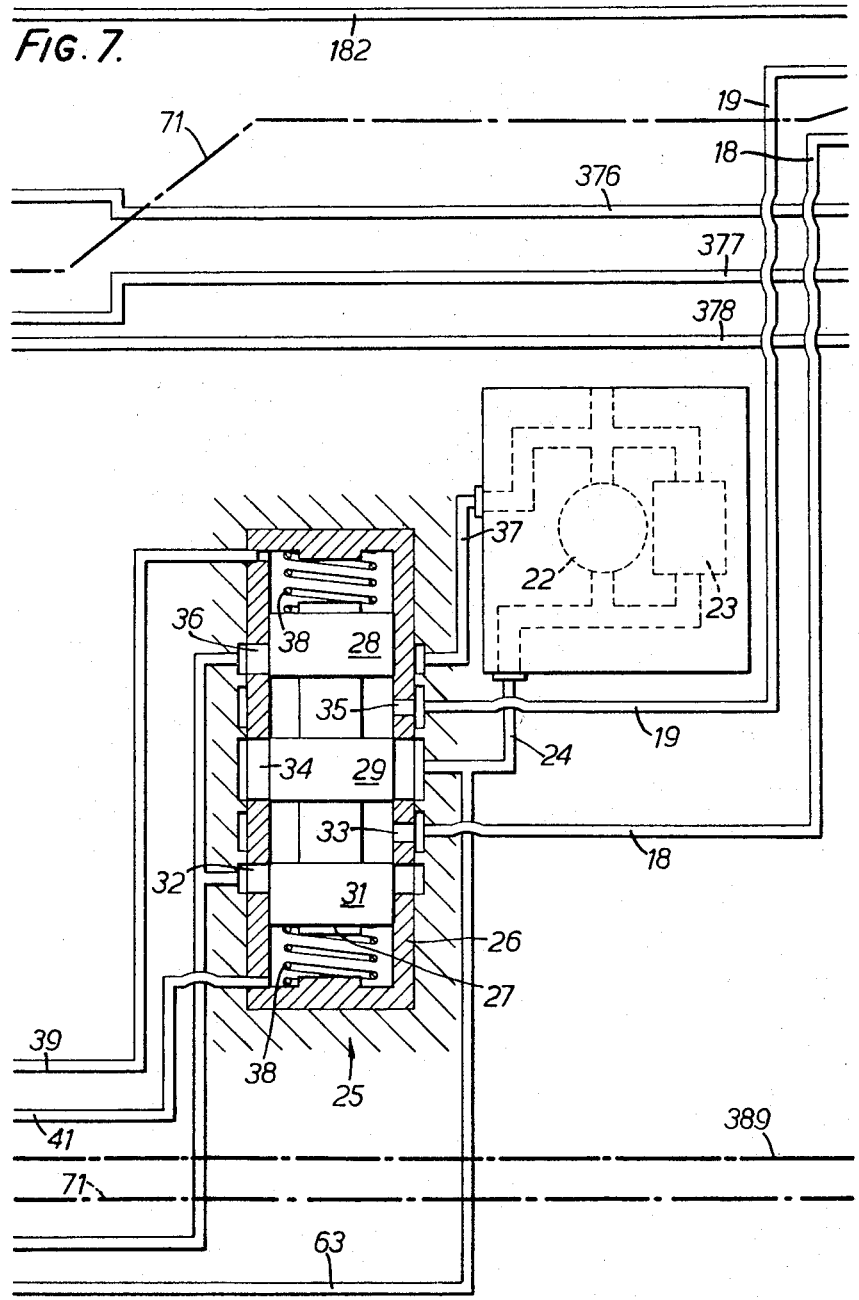
Figure 8:
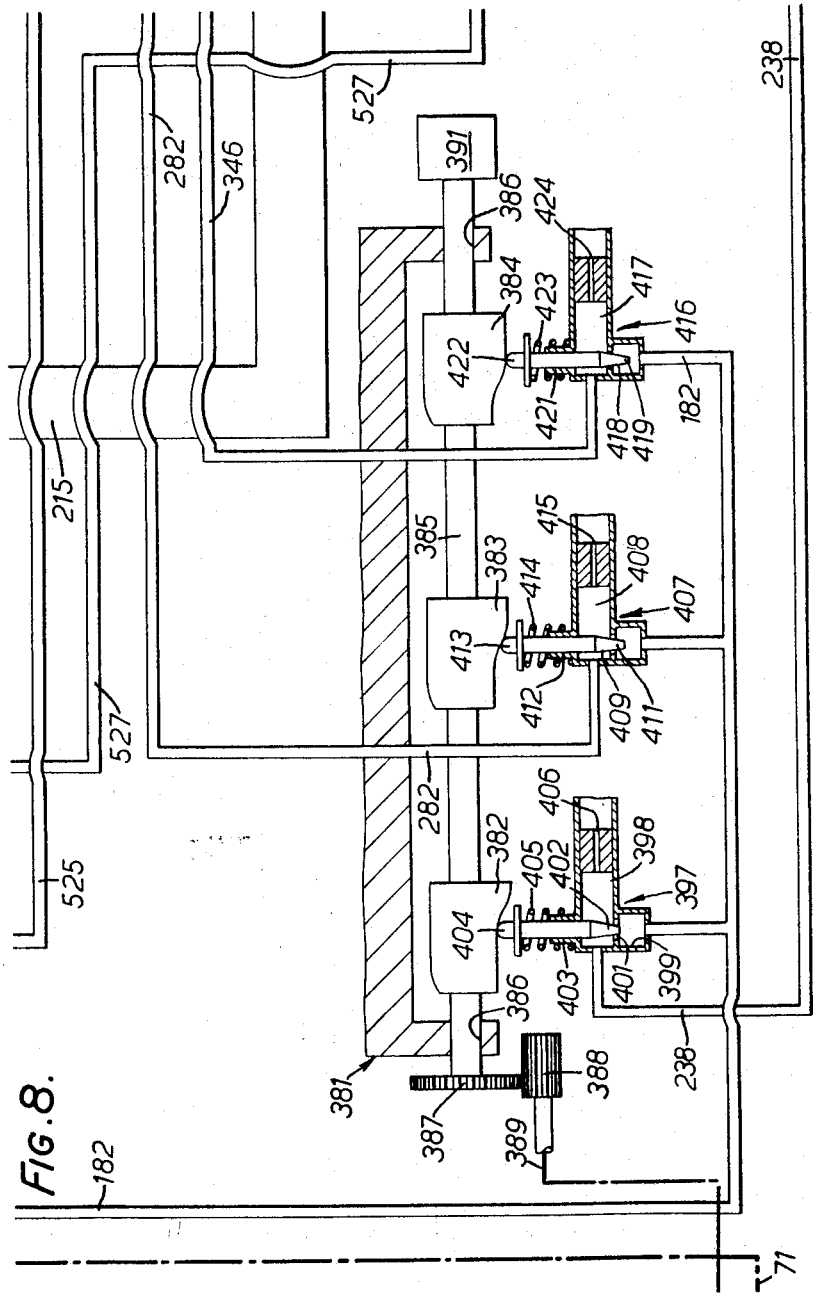
Figure 9:
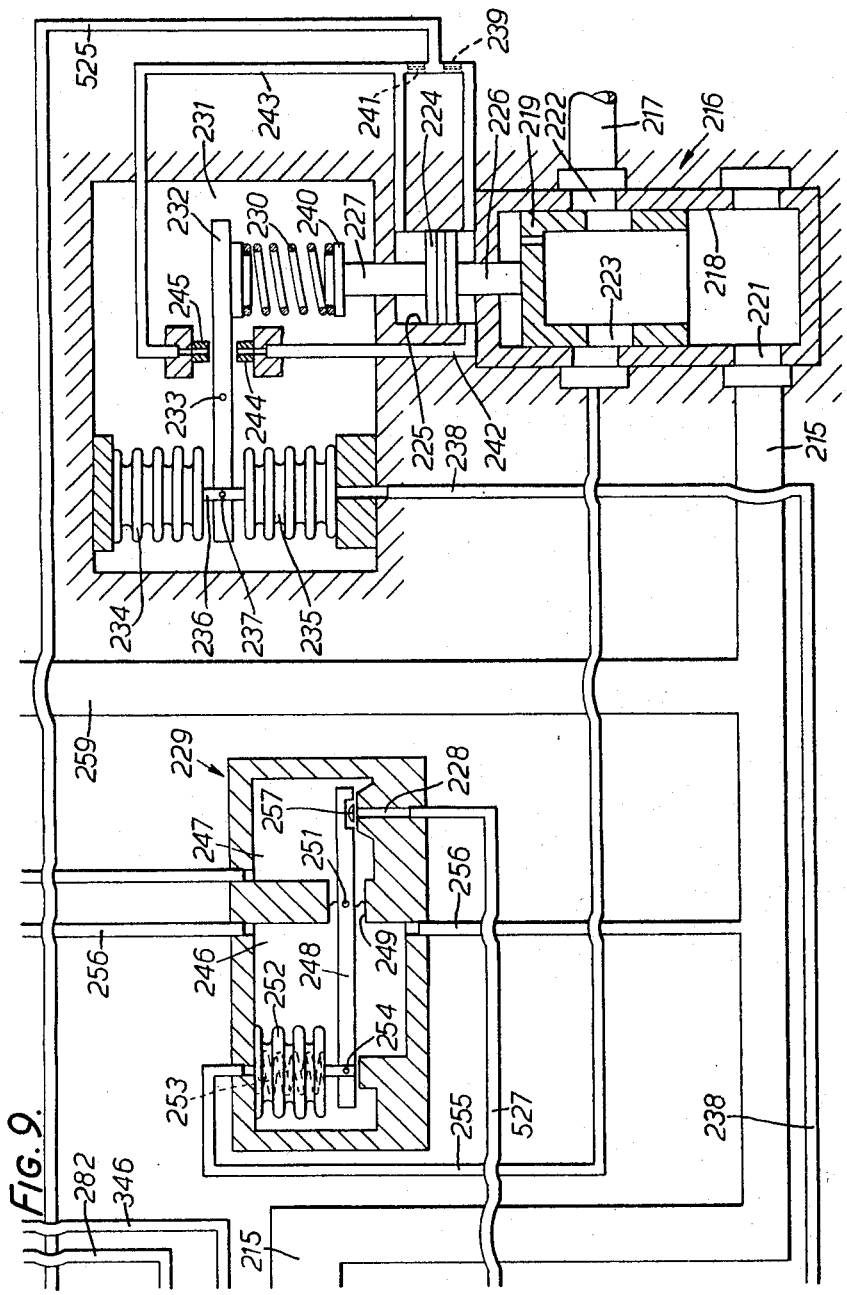
Figure 10:
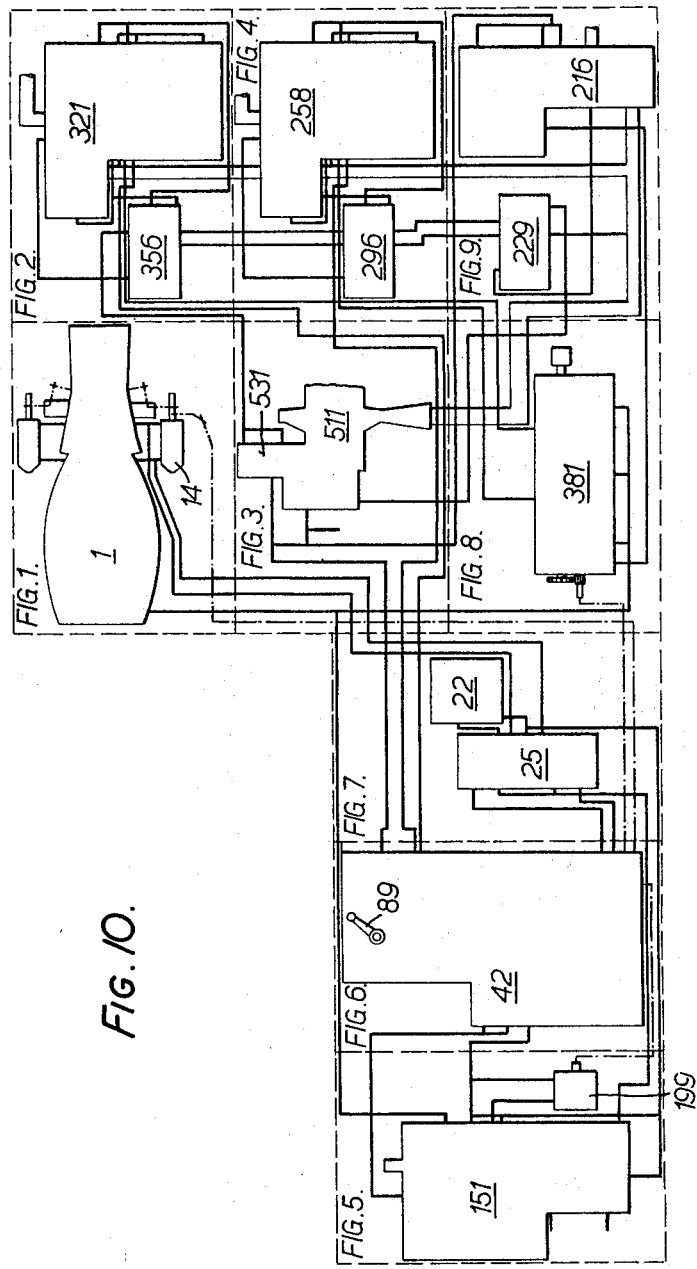

One embodiment of the invention for use with an aircraft gas turbine engine will now be described with reference to the accompanying diagrammatic drawings in which, FIGURE 1 is a diagrammatic illustration of a gas turbine engine controlled by the present system, FIGURE 2 is a detailed illustration of a portion of the system of FIGURE 10 including the flow metering control, FIGURE 3 is a detailed illustration of a portion of the system of FIGURE 10 including the centrifugal pump assembly, FIGURE 4 is a detailed illustration including a flow control for the second gallery of the engine in the system of FIGURE 10, FIGURE 5 is a detailed illustration of the computing unit responding to ratio pressures at the inlet and exhaust of the gas turbine engine, FIGURE 6 is a detailed illustration of control valves and including the pilot's selection lever associated therewith, FIGURE 7 is a detailed showing of the hydraulic pump and associated valve assembly for the system, FIGURE 8 is a detailed illustration of the cam unit for supplying control pressures to various parts of the system, FIGURE 9 is an illustration of a portion of the system of FIGURE 10 and including details of a flow control unit, and FIGURE 10 is a block diagram of the entire system, including an indication of the way in which the various individual sheets of drawings can be assembled to provide a complete detailed system drawing.

A gas turbine engine with which the control is intended to operate is indicated diagrammatically at 1. This engine may be of any well known type but for convenience and simplicity of operation it is assumed that this engine is of the simplest type comprising a compressor and a turbine located on the same shaft and combustion chambers located between the compressor and the turbine. The invention is equally applicable to more complicated engines such for example as a two-spool engine. In order to obtain reheat there is provided in the jet nozzle 2 three sets of burner assemblies indicated a diagrammatically at 3, 4 and 5. Whilst in the illustrated embodiment a number of burners are associated with a gallery to form an assembly it is within the scope of the present invention for a burner assembly to comprise one or more actual burners. Fuel may be sprayed into the jet nozzle from these burner assemblies to heat the turbine exhaust and so to increase the thrust from the engine by increasing the velocity of the jet efflux from the nozzle. In order that the engine may continue to operate normally under reheat conditions the jet nozzle is adjustable in its area by a provision of a pair of vanes 6 and 7 secured at pivots 8 and 9 on the engine structure and arranged so that the space in between them may be adjusted. The adjustmnet means for each vane comprises a bell crank lever 11 pivoted at fulcrum 12 on the engine structure, a link 13 pivotally connected from one end of the bell crank lever to the vane, a servo cylinder 14 secured to the engine structure, a servo piston 15 in the cylinder from which a piston rod 16 extends, and a pin and slot connection 17 on the piston rod to the other end of the bell crank lever 11. The adjustment mechanisms for both vanes are secured together so that they must move in unison.

A pair of hydraulic connections 18 and 19 extend one to either end of the servo cylinders 14 to effect adjusting movement of the vanes. All the cylinders 14 are hydraulically connected in parallel to one another. Connected to the piston rod 16 is a lever 12 which provides a feed-back connection which signals movement of the vanes to the control system.

For controlling supply of hydraulic fluid to the servo cylinders a hydraulic pump 22 (FIG. 7) is provided which includes a parallel connected by-pass valve 23. The pump 22 is engine driven and the by-pass valve 23 serves to ensure that hydraulic liquid at constant pressure is available to operate the servo cylinders 14. The delivery from the pump 22 passes to a pipe 24 which enters a servo valve assembly 25. The valve assembly 25 comprises a fixed cylinder 26 within which a spool valve 27 having spaced lands 28, 29 and 31 is provided. The spool valve 27 controls five ports 32, 33, 34, 35 and 36 in a wall of the cylinder 26. The delivery passage 24 from the pump 22 enters a port 34 and flow of liquid is controlled by the land 29. Pipes 18 and 19 connect respectively to the ports 33 and 35. The ports 32 and 36 are connected in parallel to a pipe 37 to carry liquid at low pressure back to pump 22. Springs 38 located one at either end of the spool valve 27 help to urge the spool valve into its central position. The position of the spool valve 27 is adjusted by the hydraulic pressures existing at the two ends of the cylinder 26, such hydraulic pressure difference being fed to the two ends of the cylinder by pipes 39 and 41.

The pipes 39 and 41 extend from a control valve 42 (FIG. 6). This valve comprises a cylinder 43, a sleeve 44 slidable within the cylinder 43 and a spool valve 45 slidable within the sleeve 44. The spool valve 45 includes three spaced lands 46, 47 and 48. Within the wall of the cylinder 43 are located five spaced ports 49, 51, 52, 53 and 54. Co-operating respectively with these ports are the ports 55, 56, 57, 58 and 59 in the sleeve. Within the range of movement of the sleeve 44 the ports in the sleeve make connection only with their respective ports in the cylinder 43. Sleeve 44 is adjustable in an endwise sense by means of an integrally formed servo piston 61. This piston is mounted within a servo cylinder 62 operated on the servo vent principle. For this purpose the end of the cylinder 62 adjacent to the sleeve 64 is fed from pipe 63 through a restrictor 64. A small diameter extension 65 extends in a sealed manner through the end of the cylinder 62 remote from the sleeve 44 and through this projection a vent passage 66 is provided. The end 67 of projection 65 co-operates with a cam 68. If the end 67 of projection 65 is spaced from the surface of the cam 68 there will be leakage to the passage 66 which will reduce the pressure below the piston 61 as seen in the drawing so that the higher pressure above piston 61 will urge it downwardly towards the cam 68 until the end 67 is nearly in contact with the surface of the cam 68. At such position the leakage through the passage 66 will be reduced and movement of the piston 61 will stop when leakage through the passage 66 is such that the lower pressure below the piston is in force balance with the higher pressure above the piston by virtue of their differing effective areas. The cam 68 is rotated by movement of a feedback link 71 extending from the feedback lever 21 (FIG. 1) on the jet nozzle. Movement of the link 71 passes through the reversing lever 72 (FIG. 6) and the link 73 to the cam 68.

The spool valve 45 (FIG. 6) of valve 42 is pivotally connected at 74 to a lever 75 having a fixed fulcrum 76. A cam follower 77 projecting from lever 75 co-operates with the surface of a three-dimensional cam 78 by virtue of the loading applied to lever 75 by spring 79. The cam 78 is rotatably mounted by means of a rotary shaft 81 carried in a bearing 82. One end of the shaft 81 carries a pinion 83 which is mesh with a rack 84. The rack 84 forms an extension of a bar 85 which is longitudinally movable and forms the total fuel flow control for the reheat burner assemblies. Longitudinal movement of the bar 85 will cause rotational movement of the cam 78 which through follower 77 and lever 75 will cause endwise movement of the spool valve 45 to control pressure liquid to the servo valve 25 and in turn to control pressure liquid through pipes 18 and 19 to the cylinders 14 for adjusting the vanes 6 and 7. Movement of the vanes 6 and 7 will be fed back through feedback connection 71 onto the cam 68 and the arrangement is that when the spool valve 45 is moved the resulting movement of the vanes 6 and 7 fed back through the cam 68 will cause a similar movement of the sleeve 44 to bring the ports 55, 57 and 59 of the sleeve into coincidence of the lands 46, 47 and 48 of the piston valve 45.

An extension 86 from the sleeve 45 carries a slot 87 within which is movable with lost motion a pin 88 which is carried by the bar 85.

A reheat control lever 89 operable by the aircraft pilot is carried by a shaft 91 which in turn carries a cam 92. The cam 92 acts on the casing 93 of a caged spring 94. Within the casing 93 a slider member 95 is provided which is an integral extension from the bar 85. A stop 96 carried by the casing 93 limits the movement of the slider 95 within the casing 93 under the action of the spring 94. A spring 97 reacts from a fixed base 98 on to a flange 99 extending from the bar 85 to urge the bar 85 towards cam 92.

On the shaft 91 (FIG. 6) three cams 101, 102 and 103 are provided for rotation with the shaft 91. The cam 101 includes an inclined stop 104 between upper and lower dwells of constant radius. The cam 102 includes an inclined step 105 between upper and lower dwells of constant radius. The cam 103 includes an inclined step 106 between upper and lower dwells of constant radius. The three steps 104, 105 and 106 are angularly located at differing positions relatively to the lever 89 for the purpose which will be described later in the specification. The feedback link 71 from the nozzle vanes 6 and 7 carries three cams 107, 108 and 109, the cam 107 co-operating with the cam 101, the cam 108 co-operating with the cam 102, and the cam 109 co-operating with the cam 103. The cam 107 includes a pair of closely spaced inclined steps 111 and 112, these steps being located between upper, intermediate and lower dwells of constant radii. The cam 108 similarly includes a pair of closely spaced steps 113 and 114 located between upper, intermediate and lower dwells of constant radii. The cam 109 also includes a pair of inclined steps 115 and 116 closely spaced together and located between upper, intermediate and lower dwells of constant radii. A floating lever 117 extends between the cams 101 and 107 and includes a pair of followers 118, and 120 which co-operate respectively with the cams 101 and 107. Centrally the lever 117 carries a valve member 119 which seats upon a vent 121. The valve member 119 is spring-urged on to the vent 121. The arrangement is such that the valve member 119 may be lifted from the vent 121 by particular combinations of positions of the cams 107 and 101 as follows:

(a) When the upper dwells of the cams 101 and 107 contact the followers 118 and 120.
(b) When the upper dwell of cam 101 and the intermediate dwell of cam 107 contact the followers 118 and 120.
(c) When the upper dwell of cam 107 and the lower dwell of cam 101 contact the followers 120 and 118. If the lower dwell of cam 107 is opposite the follower 120 the valve member 119 will be seated irrespective of the position of the cam 101.

A lever 122 (FIG. 6) extends between the cams 102 and 108 and has followers 123 and 124 which co-operate respectively with the cams 102 and 108. Centrally the floating lever 122 carries a valve member 125 which co-operates with a vent 126. The valve member 125 is spring urged towards the vent 126. The conditions stated for unseating of valve member 119 on the vent 121 apply to the seating of the valve member 125 on the vent 126, reference of course being made to the positions of the cams 102 and 108.

A lever 127 extends between the cams 103 and 109 and includes followers 128 and 129 which co-operate with the cams 103 and 109 respectively. Centrally the floating lever 127 carries a valve member 131 which co-operates with a vent 132. The valve member 131 is spring urged towards the vent 132. The conditions for unseating of the valve member 131 from the vent 132 are the same as described for the valve member 119 but of course with reference to the cams 103 and 109.

The computing unit 151 (FIG. 5) responds to the ratio of pressures at the entry and exhaust of the turbine of the gas turbine engine and it is this ratio which is the condition for engine operation to assist in the control of the nozzle vanes 6 and 7. In the unit 151 a chamber 152 is provided in which two pairs of bellows are located, one pair of bellows 153 and 154 are secured to opposite walls of the chamber 152 and at their free ends are joined by a rod 155. A lever 156 is mounted within the chamber at a fixed pivot 157, this lever extending in between the bellows 153 and 154 and being connected by a pin 158 to the rod 155. The bellows 153 is evacuated and the bellows 154 is connected by a passage 159 to a small chamber 161. The bellows 153 and 154 are of exactly similar cross sectional area with the result that the force exerted at the pin 158 is exactly proportional to the pressure fed to the bellows 154.

Adjacent to the opposite ends of lever 156 a second pair of bellows 162 and 163 are secured to opposite walls of the chamber 152 the free ends of these bellows being joined by rod 164 having a pivotal connection 165 to the lever 156. The bellows 162 is evacuated and the bellows 163 is connected through a passage 166 to the exhaust pressure of the turbine of the gas turbine engine. The bellows 162 and 163 are of equal cross-sectional area so that at the pivot pin 165 a force is exerted on the lever 156 exactly proportional to turbine exhaust pressure. The force exerted on the pivot pins 158 and 165 are in the opposite sense.

A servo cylinder 167 (FIG. 5) by the side of the chamber 152 includes slidably mounted therein a servo piston 168. Piston rods 169 and 171 extend from the piston 168 in opposite directions through the ends of the cylinder 167 suitable seals being provided to prevent leakage from the ends of the cylinder. Liquid at pressure delivered through pipe 63 from the pump 22 is fed to either end of the cylinder 167 through two restrictors 172 and 173. From the two ends of the cylinder 167 passages 174 and 175 extend to a pair of opposed servo vents 176 and 177 located on opposite sides of the lever 156. The relative leakages from the vents 176 and 177 will determine pressure drops occurring at the restrictors 172 and 173 and will thus determine the pressures existing at either end of the cylinder 167. At one position only of the lever 156 will the pressures at the two ends of the cylinder 167 be equal.

Movement of lever 156 in either direction from this particular position will cause movement of the piston 168 in one direction or the other. The end 178 of the piston rod 169 is tapered and enters a chamber 161 through an orifice 179. A passage 181 leads to the orifice 179. A pipe 182 carries air from the delivery of the engine compressor into the passage 181. Such air having passed the orifice 179 enters the chamber 161 from which it can flow to a low pressure zone such for example as the engine nacelle through a restrictor 183. The restrictor 183 is so designed that under all conditions of engine operation it operates in the choked condition i.e. the non-dimensional flow rate through it is constant irrespective of the pressure existing in the chamber 161. The area of the orifice 179 is adjusted by axial movement of the piston rod 169. At any position of the piston rod 169 it can be said that the pressure in the chamber 161 is a constant fraction of the compressor delivery pressure irrespective of variation of such pressure. Movement of the piston rod 169 will vary the fraction of compressor delivery pressure existing in the chamber 161.

The piston rod 171 enters into a chamber 184 and the portion thereof within the chamber 184 is provided with a flattened surface 185 extending parallel to the axis of the piston rod 171. Within the supporting structure between cylinder 167 and chamber 184 a port 187 is provided around the piston rod 171 which co-operates with passage 189 within the piston rod 171. This passage terminates as a vent 192 in the flat surface 185. Adjacent to the flat surface 185 a cam 194 is rotatably mounted on a spindle 195. The cam 194 has a flat side which moves closely adjacent to the flat surface 185 and the axis of rotation is set perpendicularly to the flat surface 185 so that the spacing between the cam and the flat surface 185 remains constant. The vent 192 co-operates with the curved profile of the cam 194 in that the vent will either be open, or partly open or substantially closed depending on the relative positions of the rod 171 and the profile 196.

Vent 192 is fed with liquid at pressure from the pipe 63 through restrictor 197 and a passage 198. The passage 198 extends from a position downstream of restrictor 197 to one end of a servo cylinder 199 containing a servo piston 201. The opposite end of the cylinder 199 receives liquid at pressure from the pipe 63. The piston rod 202 extends in a sealed manner through the end of the cylinder 199 which receives liquid at pressure from pipe 63, thereby creating a difference of effective areas on the two sides of the piston 201. The piston 201 will therefore move in accordance with the degree of closure of the cam profile 196 over the vent 192. A piston rod 202 is connected to a rod 203 which extends to a lever 188 pivoted at a fixed fulcrum 191. The opposite end of the lever 188 includes a pin 193 engaging in a peripheral slot 190 formed around the rod 81 which carries the cam 78.

The cam 194 (FIG. 5) is rotatable by means of a pinion 204 secured to its shaft 195 and a rack 205 engaging the pinion. The rack extends to a servo piston 206 slidably mounted in a servo cylinder 207. The hydraulic pressures fed to either end of the cylinder 207 to control movement of the piston 206 are determined by an electro-hydraulic servo valve 208 of conventional construction, this valve being connected through an electrical conductor 209 to an electrical temperature sensing device at the inlet of the engine compressor. This temperature responsive device is capable only of slow operation.

For the supply of reheat fuel to the burner galleries 3, 4 and 5 the centrifugal pump 511 (FIG. 3) is provided. This pump operates on the principle disclosed in Patent 842,354. Within the pump casing 512 a shrouded impeller 513 is provided driven by a drive shaft 514 extending through a suitable bearing in housing 512. The drive shaft 514 extends from the gas turbine engine. The casing 512 is provided with a conventional volute which terminates in a delivery passage 215. Fuel enters into the centre of the pump impeller 513 through a plurality of radially directed apertures 516 formed in a cylindrical sleeve 517. Fuel enters the cylindrical sleeve at boost pressure through a passage 518. The end of the sleeve 517 remote from the pump is closed by wall 519 through which a piston rod 521 extends in sealed relation. On the opposite side of the wall 519 a servo cylinder 522 is located within which a servo piston 523 is slidably mounted, the piston rod 521 extending from the piston 523. Within the sleeve 517 the piston rod 521 supports a slidable sleeve 524 which fits closely within the inner diameter of the sleeve 517. Endwise adjusting movement of the rod 521 will cause the sleeve 524 to vary the degree of effective opening of the apertures 516. The sleeve 514 may be moved by the piston 523 to close the apertures 516 entirely.

For the purpose of adjusting piston 523 and the sleeve 524 high pressure fuel is fed from the main engine fuel system through pipe 525 to the end of the cylinder 522 nearer to the pump rotor 513. The end of the cylinder 522 remote from the pump rotor 513 is also fed with high pressure liquid from the pipe 525 but in this case through a restrictor 526. From the end of this cylinder 522 remote from rotor 513 a vent pipe 527 extends to a servo vent 228 in a vent unit 229 (seen in FIGURE 9 and described later). The escape flow of fuel permitted from the vent 228 will determine the pressure drop occurring through the restrictor 526 and will thus determine the pressure in the end of the cylinder 522 opposite to the rotor 513. Full fuel pressure acts on the other end of the cylinder 522 but over a smaller area of the piston 523. Adjustment of the vent 228 will therefore determine the position of the piston 523 in the cylinder 522 and will thus determine the permitted opening of the apertures 516. The speed of rotation of the pump rotor 513 and its size are so determined that throughout the range of controlled flow rates of fuel, the fuel within the casing 512 will form an annulus within the pump casing whose radial depth will determine the pressure given to the delivered liquid. The centre of this annulus is completely isolated from the atmosphere, with the result that pressure within the annulus is the vapour pressure of the liquid.

Fuel is supplied at the boost pressure of the aircraft to the inlet pipe 518. This is a comparatively low pressure sufficient to supply the various pumps in the aircraft using fuel. The pressure drop of fuel passing the apertures 516 will therefore be effectively the boost pressure, since vapour pressure is normally quite small with the result that fuel flow into the pump will be determined by the permitted opening of the apertures 516 and the boost pressure. The radial depth of fuel within the pump casing 512 will adjust automatically in accordance with the flow rate of liquid entering the rotor 513 to ensure that such flow rate is sufficiently pressurised to flow through the delivery 215.

For shutting-off the entry flow of fuel into the pump 511 a shut-off valve unit 531 (FIG. 3) is provided. The passage 518 extends from a chamber 532 in the unit 531 and fuel enters the passage 532 from an inlet connection 533. Within the chamber 532 a shut-off valve member 534 is adapted to seat upon a seat 535 to shut off flow from the connection 533 into the passage 518. Adjacent to the chamber 532 a servo cylinder 536 is located which contains a servo piston 537. From the piston, a piston rod 538 extends in a sealed manner through one end of the cylinder 536 into the chamber 532, and within the chamber 532 the valve member 534 is mounted on the piston rod 538. In the cylinder 536 a spring is provided which acts to urge the piston in a direction causing the valve 534 to close upon its seat 535. The end of the cylinder 536 containing the spring 539 is connected by pipe 541 to the passage 533 which is at the low boost pressure of the aircraft. Fuel at pressure from the pipe 525 is fed through restrictor 542 into the end of the cylinder 536 adjacent to the chamber 532. A pipe 141 extends from the lower end of cylinder 536 to the vent 121 (FIG. 6) so that closure of the vent 121 may cause valve member 534 to be lifted from its seat in the pump to initiate fuel flow.

The fuel in the delivery passage 215 (FIGS. 3 and 9) passes through a flow control 216 (FIG. 9) before entering a passage 217 which leads to the first burner assembly 3 in the engine. Control 216 comprises a cylinder 218 (FIG. 9) within which a sleeve 219 is slidable. The passage 215 terminates in a port 221 in the wall of the cylinder 218. Fuel leaves through a port 222 in the wall of the cylinder 218 which leads to the passage 217. A sleeve 219 includes a plurality of ports 223 in its wall which overlap the port 222 and determine an effective throttle aperture for fuel entering the passage 217. The sleeve 219 is adjusted in the axial direction by means of a servo piston 224 slidably mounted in a servo cylinder 225. Piston rod 226 connects piston 224 to the sleeve 219, such piston rod extending in sealed manner through one end of the cylinder 225. Another piston rod 227 extends in sealed manner through the opposite end of the cylinder 225 and carries a spring end cap 240 against which compression spring 230 acts in compression.

The spring 230 and the cap 240 are located in a chamber 231 formed within the structure which includes a cylinder 218. Within the chamber 231 a lever 232 is secured at pivot 233 for pivotal movement. The compression spring 230 acts on one end of the lever 232. At the opposite end of the lever 232 a pair of bellows 234 and 235 are fixed to opposite walls of the chamber 231, the free ends of these bellows being driven by a rod 236 having a pivot pin connection 237 to the lever 232. The bellows 234 is evacuated whilst the bellows 235 is connected to the pipe 238 to receive a control pressure proportional to delivery pressure from the engine compressor. The servo piston 224 is energised by fuel at pressure from the main engine fuel system fed through pipe 525. Fuel at pressure is fed to the two ends of the cylinder 225 through a pair of restrictors 239 and 241. A pair of passages 242 and 243 extend from the two ends of the cylinder 225 to a pair of vents 244 and 245 disposed one on either side of the lever 232. The position of the lever 232 between the vents 244 and 245 determines the relative escape flows from these vents and thereby determines the relative values of reduced pressures in the two ends of the cylinder 225. The arrangement is such that an equilibrium position for the servo piston 224 is attained when the load given by movement of the pistons 224 through the spring 230 on to the lever 232 balances the load imposed on the bellows 235 by pressure fed through the pipe 238. The arrangement is such that with increase in pressure through pipe 238 the ports 223 more and more coincide with the port 222 permitting increased flow of fuel through passage 217 into the first gallery.

In order to accurately determine flow through the flow control 216 means are provided to control the pressure drop at the overlapping ports 222 and 223 to a fixed constant value. For this purpose the vent unit 229 (FIG. 9) is provided. The vent unit 229 comprises a body enclosing a pair of separated chambers 246 and 247. A pivoted lever 248 extends through a sealed hole 249 in the wall between the two chambers 246 and 247, this hole being suitably sealed against flow of liquid by means of a metallic diaphragm. The pivot 251 is located in the hole. Within the chamber 248 a bellows 252 is provided within which is located a compression spring 253 which applies a predetermined loading to the lever 248 through a pivot pin 254. The interior of the bellows 252 is connected by pipe 255 to the port 222 to receive pressure downstream of the throttle position. The chamber 246 is connected by pipe 256 to the fuel pressure delivery pipe 215. There is thus supplied across the bellows 252 the pressure drop occurring at the overlapping ports 222 and 223. Within the chamber 247 the vent 228 is located which is controlled by a half-ball valve 257 which is carried by the lever 248. The operation is that with increase in pressure drop at the overlapping ports 222 and 223 the bellows 252 will tend to collapse to move lever 248 to seat the half-ball 257 on the vent 228. Thus increase in flow will reduce the leakage through the vent 228 from the end of cylinder 222 remote from the pump rotor 513 to raise pressure and to cause piston 523 to move the sleeve 524 in the sense to reduce the effective opening of the apertures 516.

The fuel flow to the second gallery is controlled by a flow control 258 (FIG. 4). A branch pipe 259 from the delivery pipe 215 enters the port 261 in the wall of a cylinder 262. This port is comparatively long in its axial extent and includes one bounding straight edge 263 which is parallel to the axis of the cylinder 262. A port 264 in the wall of cylinder 262 connects to a passage 265 which carries fuel from the valve 258 to the second burner assembly. Within the cylinder 262 a sleeve 266 is provided having closed ends. At the right hand end of the cylinder 262 as seen in the drawing the sleeve 266 is provided with a pinion 267 in mesh with a rack 268. The rack joins a piston rod 269 which extends in sealed relation through the wall of the cylinder 262 into a servo cylinder 271 extending transversely to the cylinder 262. Within cylinder 271 the connecting rod 269 is secured to a piston 272. From the opposite side of the piston 272 a connecting rod 273 extends into a chamber 274 forming part of the structure which mounts cylinder 262. Within chamber 274 the rod 273 terminates in the spring end cap 275. Also within the chamber 274 is a lever 276 pivoted at a fulcrum 277. A compression spring 278 acts between the lever 276 and the rod 273. Fixed in the chamber 274 at opposite walls thereof are a pair of bellows 279 and 281. The bellows 279 is evacuated and the bellows 281 is connected to a pipe 282 to receive a control pressure which is a fraction of compressor delivery pressure. The bellows 279 and 281 are joined by a rod 283 which is connected by a pivot pin 284 with the lever 276.

For servo operation of the piston 272 fuel delivered by the pump 211 is supplied through the pipe 285 and filter 286 to a pair of restrictors 287 and 288. From these restrictors the fuel enters the two ends of the cylinder 271. From the two ends of the cylinder 271 a pair of pipes 289 and 291 extend to a pair of vents 292 and 293 disposed one on either side of the lever 276. The arrangement is such that the relative leakages permitted from the vents 292 and 293 by the position of the lever 276 determine the relative pressures in the two ends of the cylinder 271, any pressure difference causing movement of the piston 287 and consequent rotation of the sleeve 266. Movement of the piston 272 is fed back through spring 278 on to lever 276 and the arrangement is such that rotation given to the sleeve 266 is in proportion to the pressure supplied to the bellows 281.

Rotation of the cylinder 266 (FIG. 4) will determine the overlap of a port 294 in the sleeve 266, and the port 261, such overlap occuring at the straight edge 263. In this way axial movement of the sleeve 266 will not alter the overlap or port 294. The rotary movement of the sleeve 266 determines an effective opening of the port 294 in accordance with control pressure from the pipe 282 and it is arranged that axial movement of the sleeve 266 will cause a variable overlap between ports 295 in the sleeve and port 264 in the cylinder, the endwise movement being adjusted to ensure that a predetermined pressure drop occurs at the port 294. For this purpose a vent unit 296 is provided which comprises a structure including two chambers 297 and 298. A lever 299 extends through a hole 301 in the wall between the chambers and is pivoted at pivot 302 located transversely across the hole 301. A metal diaphragm located between the lever and the hole 301 prevents flow of fluid between the two chambers. The chamber 297 contains a bellows 303 containing a compression spring 304. The bellows 303 is fixed to the wall of the chamber 297 and at its free end is connected by a pivot pin 305 to the lever 299. The chamber 297 is fed with delivery pressure of fuel from the pump 511 through pipe 256 whilst the interior of the bellows 303 is fed through pipe 306 with the pressure in the interior of the sleeve 266. Such pressure is obtained by co-operating ports 307 and 308 in the sleeve 266 and cylinder 262 respectively. From the pipe 285 downstream of the filter 286 a pair of restrictors 309 and 311 carry fuel respectively to the left and right hand ends of the cylinder 262 as seen in the drawing. Pipes 312 and 313 carry liquid respectively from the left and right hand ends of the cylinder 262 to a pair of vents 314 and 315 respectively, these vents being located on opposite sides of the lever 299 within chamber 298. The arrangement is such that relative leakages from the vents 314 and 315 will determine relative pressures in the ends of the cylinder 262, such pressures causing axial movement of the sleeve 266 and variation of the overlap of ports 295 and 264 until the throttling of fuel flow into the port 264 is sufficient that the pressure drop occurring at the overlapping areas of ports 294 and 261 is at a value determined by the loading of the spring 304 within bellows 303. In this way irrespective of the pressure in the pipe 259 from the delivery of the pump 511 any desired flow rate of fuel into the second gallery may be obtained in accordance with the pressure fed through the pipe 282 into the bellows 281.

Reference is now made to the flow metering control 321 (FIG. 2) which controls fuel flow from the pipe 259 into the pipe 322 extending to the third reheat burner assembly 5. The structure of the flow metering control 321 is identical with the structure of the flow metering control 258 although as shown (FIG. 2) it assumes a different condition because the flow control to the third gallery in the drawing is cut off. The control 321 includes a cylinder 323 within which is located a sleeve 324 having closed ends. Into the wall of the cylinder 323 open a pair of ports 320 and 325. The port 320 is connected with the supply pipe 259 and it includes a straight edge 326 which extends parallel to the axis of the cylinder 323. The port 325 is a peripheral port having one edge 327 which extends in a plane perpendicular to the axis of cylinder 323. In the sleeve 324 is located a small port 328 which co-operates with the port 320. As shown the port 328 is in the cut-off position and it just fails to overlap the edge 326 of port 320. Also within the sleeve 324 are ports 329 which co-operate with the port 325, the area of overlap over the edge 327 forming an adjustable throttle for controlling fuel flow. The sleeve 324 is rotatable by means of a pinion 331 engaged by a rack 332. The rack 332 is the piston rod extending from a piston 333 slidably mounted in a servo cylinder 334 extending from the side of cylinder 323. The piston rod 332 extends in a sealed manner through one end of the cylinder 334 and from the opposite end of the piston 333 a further rod 335 extends in a sealed manner through the opposite end of the cylinder 334 to terminate in a spring end cap 336. The spring end cap 336 is located in a chamber 337. Within the chamber 337 is located a pivoted lever 338 pivoted at a fixed fulcrum 339. A spring 341 acts between the end cap 336 and one end of the lever 338. In the chamber a pair of bellows 342 and 343 are located on opposite walls thereof, the free ends of these bellows being joined by a rod 344 having a pivotal connection 345 within the end of the lever 338 opposite to the spring 341. The bellows 343 is evacuated whilst the bellows 342 is connected to a pipe 346 which receives a controlling pressure. The two bellows 342 and 343 are of equal diameter. From the two ends of the cylinder 334 a pair of vent passages 347 and 348 extend to a pair of vents 349 and 351 disposed one on either side of the lever 338. The servo liquid for supply to the cylinder 334 is obtained through filter 352 from the pipe 259, the filter leading into a pipe 353. The pipe 353 is connected to the two ends of the cylinder 334 through a pair of restrictors 354 and 355. In normal operation, other than in the shut-off condition the position of the lever 338 between the vents 349 and 351 determines the relative leakage flows from the vents and therefore the relative flow rates through the restrictors 354 and 355. This in turn determines the relative pressures at the two ends of the cylinder 354 which will cause movement of the piston 333. A position of balance is obtained when the feedback loading from piston 333 applied through spring 341 on to lever 338 is balanced by the loading imparted by the bellows 342 and 343 on to the lever 338. The position taken up by the piston 333 is therefore in direct proportion to the pressure exerted in bellows 342 from the pipe 346. The position of the piston 333 will by virtue of the rack and pinion 331 and 352 determine the overlap of the port 328 with the port 320. As shown of course the port 328 does not overlap port 320. In order to determine the overlap of the port 329 with the port 325, a vent unit 356 (FIG. 2) is provided which is similar in construction to the unit 296. It comprises a pair of chambers 357 and 358 separated by a wall having a hole 359. A lever 361 extends through the hole 359 and is pivotally secured at a pivot pin 362 which extends transversely through the hole 359. A metal diaphragm seals across the hole 359 to prevent leakage between chambers 357 and 358. In the chamber 357 a bellows 363 is provided which is internally loaded by a spring 364. The bellows is secured at one end to the wall of the chamber 357 and at its opposite end acts through a pin 365 on to the lever 361. The bellows is connected by pipe 366 with a port 367 in the wall of cylinder 323. This port co-operates with ports 368 within the sleeve 324 so that pipe 366 is always connected to receive pressure from the interior of sleeve 324. The chamber 357 is connected to pipe 256 to receive pressure from the delivery pipe 215 from the pump 511. Thus the bellows 363 responds to the pressure drop occurring at the throttle formed by the overlap of the ports 320 and 328. In chamber 358 a pair of servo vents 369 and 371 are provided one on either side of the end of the lever 361. The vent 369 is connected to a pipe 372 which extends to the right hand end of cylinder 323 as seen in the drawing. The vent 371 is connected to a pipe 373 which extends to the left hand end of the cylinder 323 as seen in the drawing. Pipe 372 is fed with liquid at pressure from pipe 353 through a restrictor 374 whilst the pipe 373 is fed with liquid at pressure from pipe 353 through a restrictor 375.

The position of the lever 361 (FIG. 2) between the vents 369 and 371 determines the relative flow rates from the two vents and thus the flows through the two restrictors 374 and 375. This in turn determines the relative pressures acting at the two ends of the cylinder 323 and will urge the sleeve axially to adjust the overlap of the ports 329 with the port 325 to the extent that the pressure drop occurring at the overlap of ports 320 and 328 is maintained at a constant value determined by the loading of spring 364. By maintaining the pressure drop at these ports constant, the flow rate through the pipe 322 to the third gallery will be controlled to a desired value.

The acual shutting-off or shutting-on of fuel flow to the three burner assemblies 3, 4 and 5 (FIG. 1) is determined by the closing or the opening of the three vents 121, 126 and 132 (FIG. 6). The vent 121 which controls the first assembly is connected to a pipe 141 which extends from the cylinder 536 and shut-off unit 531 (FIG. 3). When vent 121 is closed piston 537 will move upwardly as seen in the drawing (FIG. 3) because of the rise in pressure beneath it and such movement will lift valve member 534 from its seat permitting entry of fuel at boost pressure into the pump 511. From the pipe 511 fuel will then be pumped through passage 215 to the flow control 216 (FIG. 9) which will control fuel delivered to passage 217 by acting on piston 523 of the pump 511. Similarly the servo vent 126 for the second gallery is connected through pipe 377 to the upper end as seen in the drawings (FIG. 4) of servo cylinder 271 of the control 258. When the servo vent 126 is closed servo piston 272 will position itself as described in accordance with the pressure existing in pipe 282. When vent 126 is open the pressure above piston 272 as seen in the drawing (FIG. 4) will be reduced to a very low value to rotate the sleeve 266 to a position where port 294 does not overlap port 261 thereby shutting-off flow to the second gallery. Vent 132 for the third gallery is connected to pipe 378 which extends to the upper end of the servo cylinder 334 (FIG. 2) of control 321. When the vent 132 is closed, servo piston 333 will position itself in accordance with pressure supplied from pipe 346. When the vent 132 is open, the pressure above the servo piston 333 will reduce to a very low value causing the sleeve 324 to rotate to the position indicated where the port 328 does not overlap the port 320. In this way fuel flow is cut off from the pipe 322 leading to the third assembly.

For supplying control pressures to the pipes 238, 282 and 346 a cam unit 381 (FIG. 8) is provided. In this unit three three-dimensional cams 382, 383 and 384 are mounted for rotation on a cam shaft 385 carried in bearings 386. This shaft 385 carries a gear wheel 387 in mesh with a long pinion 388 so that longitudinal movement of the shaft 385 may occur without wheel 388 and pinion 389 coming out of mesh. The pinion 388 receives rotational drive by a convenient link 389 from the shaft 81. At the end of the shaft 385 opposite to the gear 387 a corrector unit 391 is provided which responds to temperature of air at the engine intake and adjusts the longitudinal position of the shaft 385 accordingly.

Co-operating with the cam 382 is a restrictor unit 397. Within this unit is a chamber 398 fed through the passage 399 with delivery pressure from the compressor of the gas turbine engine through pipe 182. An orifice 401 controls entry of air into the chamber 398 and in the orifice tapered pin 402 is slidably mounted. The tapered pin 402 is carried by a bearing 403 extending from the wall of the chamber 398 and at its outer end is provided with a nose which engages the surface of cam 382. A spring 405 urges the tapered pin 402 outwardly so that the nose 404 remains constantly in contact with the cam 382. Air leaves the chamber 398 through a restrictor 406 to a low pressure zone such as the engine nacelle, the restrictor 406 is designed so that under all its operating conditions it is chocked. This means that the non-dimensional flow rate through the restrictor 406 is substantially constant irrespective of the applied pressure and therefore that for any one position of the tapered pin 402 the pressure within the chamber 398 is directly proportional to the compressor delivery pressure supplied through pipe 182. This proportionality will vary with alteration of the position of the tapered pin 402 following rotation of the cam 382. The pipe 382 is connected to the chamber 398 so that the pressure in chamber 398 forms a control pressure on bellows 234 of the flow control 216 for the first assembly 3.

A restrictor unit 407 (FIG. 8) co-operates with the cam 383 and the structure is similar to the unit 397, in particular it contains a chamber 408 fed to orifice 409 from pipe 182. Within the orifice 409 tapered pin 411 is slidably mounted in bearings 412 forming part of the wall of the chamber 408.

Externally of the chamber tapered pin 411 has a nose 413 urged by a spring 414 into engagement with the cam 383. A restrictor 415 arranged always to operate in a chocked condition, carries air from the chamber 408 to a low pressure zone. As described with reference to unit 397 the pressure in the chamber 408 for any one position of the tapered pin 411 is proportional to the compressor delivery pressure supplied through pipe 182, the proportionality varying with the axial position of the tapered pin 411. The chamber 408 is connected to pipe 282 so that pressure in chamber 408 forms a control pressure acting in bellows 281 for the control 258 to determine flow rate to the second assembly.

A restrictor unit 416 co-operates with the cam 384. This unit is similar to unit 397 and 407. It comprises a chamber 417 fed with compressor delivery pressure from pipe 182 through an orifice 418. Within the orifice 418 a tapered pin 419 is axially slidable being supported by a bearing 421. Tapered pin 419 has a nose 422 engaging the cam 384, the whole pin being spring loaded by a spring 423 so that nose 422 constantly engages cam 384. Restrictor 424 carries air from the chamber 417 to a low pressure zone and is arranged to operate constantly in a direct condition. For any one position of the tapered pin 419 the pressure in chamber 417 is proportional to compressor delivery pressure. Variation in axial position of the tapered pin 419 will vary the proportionality. Pressure from the chamber 417 passes along the pipe 346 to the bellows 342 of the flow control 321 and thus determines flow rate of fuel through pipe 322 to the third assembly 5.

In normal operation of the engine without reheat the pilot's draw lever 89 (FIG. 6) is maintained in a fully anti-clockwise position, and in this condition the cams 92, 102 and 103 will be held in a full anti-clockwise direction. The bar 85 and the feedback projection 86 will be raised to their uppermost positions and the vanes 6 and 7 will be closed to their innermost positions giving a jet nozzle of minimum area. The cams 107, 108 and 109 will also be rotated in a fully anti-clockwise sense and in particular, the followers 120, 124 and 129 will all be resting on the outermost dwells of the cams 107, 108 and 109. Also the followers 118, 123 and 128 will be resting on the outermost dwells of the cams 101, 102 and 103. The three valve members 119, 125 and 131 will thus all be held clear of the vents 121, 126 and 132. In particular the maintaining of the valve member 119 clear of the vent 121 will mean that in the pump unit 511 the shut-off valve 534 will be retained on its seat preventing flow of fuel into the pump. Since no fuel can then leave the pump 511 through delivery pipe 215 there will be no flow through the ports 222 and 223 of the flow control 216, and accordingly there will be no pressure drop. The bellows 252 of the vent unit 229 will therefore extend fully to open the servo vent 228. This in turn will reduce the pressure in the left hand end of servo cylinder 522 of the pump to a very low value causing a maximum opening of the apertures 516 in the centre of the pump impeller 513.

The fact that the vents 126 and 132 for the second and third assemblies are also open will cause the sleeve 266 and 324 of the flow controls 258 and 321 to move their respective ports 294 and 328 to the closed position. The fuel system of the main engine is provided with interlocking means which ensure that the reheat operation cannot be selected by the pilot until the engine is running at its maximum maintainable speed. When the engine is raised to its maximum maintainable speed the piston 168 which responds to turbine pressure ratio will rise to respond to the increase in pressure ratio as engine speed increases and at the maximum maintainable speed the vent 192 will be in a position where it is only partially closed by the cam periphery 196.

The selection of a small degree of reheat by the pilot by moving the lever 89 in a clockwise direction will result in rotation of the four cams 92, 101, 102 and 103. Rotation of cam 92 will urge bar 85 downwardly. The spring 94 is arranged to be considerably stronger than the spring 97 so that plunger 95 in casing 93 will be held against the outerstop 96 although the loading of the spring 97 acts against the loading of spring 94. Pin 88 will move within the permitted lost-motion in slot 87 during such movement of bar 85. This movement of bar 85 will rotate pinion 83 and cam 78 to cause lowering of lever 75 and the valve member 45. By movement of the lands of this valve pressure from the pipe 63 will be connected to flow through ports 52, 57, 58, 53 into the pipe 39 to supply liquid pressure to the upper end of the servo valve cylinder 26 to urge the servo valve member 31 downwardly. This in turn will connect liquid pressure from pipe 24 through ports 34 and 35 to the pipe 19 to supply liquid pressure to the ends of the servo cylinders 14 which cause movement of the bell cranks 11 and links 13 to increase the area of the jet nozzle by the outward movement of the vanes 6 and 7. At the same time rotation applied to the shaft 81 will rotate shaft 389 and the cams in the cam unit 381. The movement of the lever 89 will have rotated cam 101 to the extent that the step 104 passes under the cam follower 118 allowing it to move on to the lower dwell of cam 101. The spring loading will then push valve member 119 towards the vent 121 but will not be able to close it until the vanes 6 and 7 have moved slightly and the feedback through the shafts 71 has rotated the cam 107 to the extent that the first step passes under the follower 120 so that the follower rests on the intermediate dwell. The floating lever 117 effectively sums the movements of the two followers 118 and 120 at the valve member 119, this movement then being sufficient to close the vent 121. Closure of the vent 121 will cut off leakage from the pipe 141 and pressure will build up in the lower end of cylinder 536 of the shut-off valve unit 531. This increase in pressure will raise the servo piston 537 to lift valve member 534 from its seat 535 permitting fuel at boost pressure from the connection 533 to enter passage 518 into pump 511. Since initially the apertures 516 are fully open there will be a substantial flow rate through the delivery pipe 215. Immediately this flow rate passes through the overlapping apertures 222 and 223 of the flow control 216 a pressure drop will occur which is fed to the bellows 252 of vent unit 229. The half-ball valve 257 will immediately move to a controlling position having regard to the vent 228 to cause adjustment of the servo piston 523 in the pump 511 so that delivery from the pipe 511 is reduced to the value at which the predetermined pressure drop occurs at the overlapping ports 222 and 223 of the flow control 216. In this condition the rate of fuel flow is at a minimum and is controlled principally by the setting of the tapered pin 402 in the restrictor unit 397 which determines a control pressure existing in the bellows 235 of flow control 216. Such fuel flow is then sprayed from the first burner assembly 3 into the jet nozzle. Ignition of such reheat fuel takes place in any conventional manner. On ignition of the fuel there is a substantial pressure rise in the jet nozzle which reacts on the turbine pressure ratio piston 168 to cause it to indicate a reduction of turbine pressure ratio. Effectively the action is that pressure will rise in the bellows 163 serving the balance of lever 156 to lower the pressure under piston 168 so that it will move downwardly as seen in the drawing so that vent 192 becomes covered by the periphery 196 of cam 194. This will raise pressure on the left hand side of piston 201 to cause movement of piston rod 22 and link 203 which will react through lever 188 on to the shaft 81 to move it in the endwise sense to the right as seen in the drawing to cause further downward movement of valve member 45 and further opening movement of the vanes 6 and 7. Assuming that the pilot holds the lever 89 at a fixed small degree of reheat fuel flow the pressure ratio responsive unit 151 acting through piston 201 and lever 188 to produce endwise movement of the shaft 81 will adjust the opening of the nozzle to maintain the pressure ratio of the turbine at a predetermined value, i.e., that value which will move piston 168 to a position where the vent 192 is partially uncovered only by the periphery 196 of cam 194. In this condition the feedback projection 86 will locate the slot 87 so that the pin 88 is approximately positioned at its centre. The purpose of the lost motion device formed by pin 88 and slot 87 is to prevent an excessively high rate of reheat fuel flow by the pilot before the nozzle vanes 6 and 7 have the time to adapt themselves to the reheat fuel flow. The movement of the vanes 6 and 7 under the control of piston 168 will further rotate the cams 107, 108 and 109 to the extent that the follower 120 is now opposite to the lowermost dwell of the cam 107. Reheat reducing movement of the lever 89 in the anti-clockwise sense although it might move step 104 of cam 101 under the follower 118 will not lift the valve member 119 from the vent 121 and thus cannot immediately cut off reheat fuel flow.

Movement of the lever 89 in the reheat fuel flow increasing direction will cause downward movement of bar 85 which in turn will rotate shaft 81 and the cam shaft 385 to increase pressure in chamber 398 and thus increase pressure in bellows 235 to increase the opening of the overlap between ports 223 and 222 in the control 216. This in turn will react on the servo piston 523 in the pump to open the apertures 516 and permit more fuel flow which raises the pressure drop at the overlapping ports 222 and 223 to the value determined by the spring loading of bellows 252. When fuel flow has been increased to the extent that the maximum possible amount is being injected at the assembly 3 it is arranged that the nose 404 of the tapered pin 402 engages a constant radius dwell on the cam 382 and further movement of the lever 89 cannot then cause a further increase of fuel flow to the first burner assembly. At a position of the lever 89 adjusting the balance of position at which nose 404 engages the constant radius part of cam 382 the cam 102 will have moved to the extent that step 105 passes under the follower 123 and also the final increase of fuel flow by the cam 381 will have caused automatic opening of the vanes 6 and 7 so that cam 108 moved by the feedback link 21 attains a position where the follower 124 moves down the first step 124 to the intermediate dwell. At this point the valve member 125 closes on to the vent 126. The leakage flow through the vent 126 is then cut off allowing the pressure at the upper end of cylinder 271 in control 258 to rise to a value determined by the leakage permitted from the vent 292. The piston 272 will then descent into a controlling position as determined by the pressure fed from chamber 408 through pipe 282 to the bellows 281. Servo piston 272 will then immediately be under the control of the lever 276 and it will move downwardly as seen in the drawing to rotate sleeve 266 so that port 294 overlaps port 261. Flow of fuel then has access through the overlapping ports from the pipe 215 into the pipe 265 leading to the second gallery. Piston 272 will move to the position determined by the control pressure fed to bellows 281 from chamber 408 of restrictor unit 407 and the vent unit 296 will control endwise movement of the sleeve 266 to ensure that a fixed pressure drop occurs at the overlapping ports 294 and 261.

The extra flow required for the second gallery is arranged to be well within the capabilities of the pump 511. The extra flow will reduce momentarily the flow to the first assembly giving a reduction of pressure drop at the overlapping ports 222 and 223 of the first flow control 216. Such momentary reduction will cause momentary opening of the vent 228 (FIG. 9) which will cause substantial movement of the sleeve 524 in the centre of the pump impeller 513 to increase the size of the apertures 516 feeding fuel into the pump. Ignition of the fuel from the second assembly is by the burning fuel from the first assembly. Immediately ignition takes place the pressure will rise in the jet pipe and the turbine pressure ratio will fall. The piston 168 (FIG. 5) will then move downwardly as seen in the drawing so that the vent 192 is closed by cam 194. This will raise pressure at the left hand end of cylinder 199 causing movement of the piston 201, link 203, lever 188 and pin 193 to cause endwise movement of the shaft 81 in the sense to open the vanes 6 and 7 to tend to restore pressure ratio across the turbine. Such opening movement of the vanes 6 and 7 will cause downward movement of the feedback projection 86, and slot 87 will eventually come to rest at a position where the pin 88 lies approximately in the middle of the slot 87. The movement of the vanes 6 and 7 by feedback through the link 71 will rotate cam 108 so that follower 124 (FIG. 6) is now adjacent to the lowermost dwell. If the aircraft pilot then pulls back the lever 89 a small amount and the step 105 of cam 102 passes under follower 123 the movement given to the floating lever 122 will not be sufficient to lift the valve member 125 from the vent 126 and so cancel the fuel flow to the second assembly. However such backward movement of the lever 89 will rotate the cam shaft 385 of cam unit 381 (FIG. 8) in the sense to urge tapered pin 411 into the orifice 409 to a small extent to reduce the pressure in chamber 408 and so to reduce the fuel flow metered to the second assembly by the control 258. If the pilot is to cut off fuel flow to the second assembly he must move the lever 89 in the anti-clockwise direction to a substantial extent so that reduction of the total fuel flow to the first and second assemblies causes automatic closure of the vanes 6 and 7 to the extent that cam 108 is rotated to bring its intermediate dwell under the follower 124 at which point valve member 125 is lifted from vent 126 which reacts to the control unit 258 to cause rotation of sleeve 266 to shut off fuel flow through the second assembly.

Assuming now that the pilot has not moved the lever in the anti-clockwise direction but has continued moving the lever 89 in the clockwise direction the fuel flow to the second assembly will be increased by the fact that such rotation of lever 89 rotates cam 383 to withdraw tapered pin 411 (FIG. 8) from the orifice 409 to increase the porportionality of compressor delivery pressure fed to chamber 408 and thus through pipe 282 into the bellows 281. After movement of the reheat lever by about two thirds of its movement the step 106 of cam 103 will pass under the follower 128 allowing partial movement of valve member 131 on to the vent 132. The movement given to the cam shaft 385 will rotate cam 383 until a dwell of constant radius will cause no further movement of the tapered pin 411. Just before this constant dwell of cam 383 is attained the fuel flow through the two assemblies will have reached a value to cause automatic adjustment of the vanes 6 and 7 to rotate the cam 109 to the position at which the first step 116 passes under the follower 129 enabling the follower to engage the intermediate dwell of cam 109. The valve member 131 is then able to close the vent 132 to prevent leakage and thus to raise pressure in pipe 378 to render the servo piston 333 of control unit 321 effectively under the control of the pressure in chamber 417 of the cam unit 381. The fuel flow from the control unit 321 will then pass through the third burner assembly 5 and the operation of the system will then be followed as described with reference to the initiation of flow to the second burner assembly 4. In particular it is to be noted that on initiation of flow the automatic opening of the vanes 6 and 7 by the pressure ratio control 152 will cause further rotation of cam 109 to give the hysteresis effect. The follower 129 is then adjacent the lowermost dwell 109 whereby a small anticlockwise movement of the lever 89 by the pilot which might move the step 106 under the follower 128 cannot lift valve member 131 from the vent 132.

In order to reduce reheat fuel flow the pilot will move the lever 89 in the anti-clockise direction. If the pilot is attempting to reduce reheat flow quickly such rotation will cause the bar 85 to move only to the extent that pin 88 engages the lower end of slot 87, further movement of lever 89 then rotating the cams 101, 102 and 103 and 92. Upward movement of the bar 85 will rotate shaft 81 and the cam shaft 385 so that initially tapered needle 419 (FIG. 8) is urged into its orifice 418 to reduce the control pressure in chamber 417. This in turn will react on the control unit 321 to reduce the fuel flow to the third assembly 5. Reducing fuel flow will react through the pressure ratio control 152 to cause the vanes 6 and 7 to close together and to rotate the three cams 107, 108 and 109. As soon as the step 115 of cam 109 passes under the follower 129 the valve member 131 will be lifted from vent 132 permitting leakage and causing complete shut-off of flow of fuel to the third assembly 5. With reduction in fuel flow and closure of the vanes 6 and 7 the feed-back projection 86 will move upwardly under the loading of the spring 97 which will move or tend to move the pin 88 away from the lower end of the slot 87. Reduction of fuel flow then takes place in the second assembly by the movement of the cam 383 to push tapered pin 411 into its orifice 409 thus reducing the control pressure in the chamber 408 and reducing fuel flow selected by the control 258 to the second assembly. As the vanes 6 and 7 close still further the movement of the step 113 of cam 108 under the follower 124 will lift valve member 125 from vent 126 to cause complete shut off of fuel to the second assembly. Further reduction of fuel flow will take place by the action of cam 382 (FIG. 8) to urge tapered pin 402 into the orifice 401 reducing the control pressure in the chamber 398 which will react through the control 216 and the servo piston 523 and pump 511 further to reduce fuel flow to the first assembly. When the vanes 6 and 7 are almost at their minimum position, the step 111 of cam 107 will pass under the follower 120 to lift valve member 119 from vent 121. This will cause seating of valve member 534 upon its seat 518 to prevent further entry of fuel into the pump 511. The pump 511 will then deliver what fuel it contains into the pipe 215 and at this point the flow rate to the first burner assembly will drop to zero. Because the pump 511 is a centrifugal pump it can run in the empty condition without undue development of heat. Because of the fact that the delivery of fuel through ports 222 and 223 of the control 216 is zero there will be no pressure drop and the reaction of the vent unit 229 is to open vent 228 completely to cause servo piston 523 of the pump to move the sleeve 524 to uncover the apertures 516 in the centre of the pump completely. Thus preparing pump 511 for initiaof reheat fuel flow.

In the reduction of reheat fuel flow the cam 92 will have moved out of contact with the casing 93 of the caged spring 94 and the determination of the rate of reduction of reheat fuel flow is effected by the spring 97 urging the bar 85 continuously to the end of the lost motion relatively to the slot 87 in the feedback member 86. The rate of reduction of reheat fuel is then dependent completely on the rate at which the servo pistons 15 can move the vanes 6 and 7 to their minimum inward position. When increase in reheat fuel flow is selected by the pilot by pushing his control lever 89 completely in the clockwise direction the casing 99 will compress the caged spring 94, but movement of the bar 85 will be limited in the fuel increase direction by the lost motion relative to the feedback member 86 given by the pin 88 in slot 87. This arrangement ensures that under all circumstances the reheat fuel flow fed to the jet nozzle cannot at any instance vary substantially from the optimum value of reheat fuel flow for the area of the jet nozzle at that instance. Basically however reheat fuel flow is directly under the control of the pilot's lever 89 and the nozzle area adjusts itself automatically in accordance with the selected reheat fuel flow to maintain constant an engine operating condition which in the particular embodiment is the pressure ratio of the turbine.

The hysteresis means in the described embodiment is the arrangement of the two sets of cams 101, 102, 103 (FIG. 6) and 107, 108, 109 together with the floating levers 117, 122 and 127 so that when reheat fuel flow is selected by one of the cams 101, 102, 103 the nozzle area increase fed back to the cams 107, 108, 109 reacts on the floating levers to ensure that any small reheat flow reducing movement cannot cancel the signal for reheat flow given by closing of the valve members 119, 125 and 131. The selector valves to feed fuel successively to the burner assemblies are the valve members 119, 125 and 131 together with the associated controls 216, 258 and 321 and the vent units 229, 296 and 356. The summation device for each selector valve in the described embodiment is the appropriate floating lever 117, 122 or 127.

I claim as my invention:

1. A control system for a gas turbine engine having a variable area jet efflux nozzle and at least two reheat burner assemblies located downstream of the turbine to supply reheat fuel to gas flowing through the nozzle, comprising in combination: a manually-operable control member; control means responsive to said member for selecting the total fuel flow for the reheat burner assemblies; nozzle area control means responsive to an engine operating condition to adjust nozzle area in the sense to tend to maintain said condition constant; selector valve means feeding fuel successively to the burner assemblies in response to total fuel flow and shutting off fuel flow successively from the assemblies in response to a reduction in total fuel flow; and hysteresis means included in said control means maintaining the position of the manually-operable control member at which fuel starts to flow to a burner assembly during increase of total fuel flow different from the position of the control member at which fuel is shut off from the burner assembly during reduction of total fuel flow.

2. A control system for a gas turbine engine as defined in claim 1 wherein for each assembly there is provided a selector valve and operating means for the selector valve comprising: summation means; first movement means feeding a predetermined movement to said summation means when said manually-operable control member attains a predetermined position; and second movement means feeding a first predetermined movement to said summation means when said nozzle attains a predetermined area, said selector valve being arranged for operation by the summation means to feed fuel to the said assembly only when said two predetermined movements have been fed to said summation means.

3. A control system for a gas turbine as defined in claim 2 wherein said hysteresis means includes said second movement means, said second movement means being operable to feed a second further predetermined movement to said summation means when the nozzle area increases a small amount beyond the area at which said second movement means gives its said first predetermined movement to said summation means, the two predetermined movements of said second movement means acting through said summation means being capable on their own of maintaining the selector valve in a condition to feed fuel to the burner assembly.

4. A control system for a gas turbine engine as defined in claim 2 wherein said summation means comprises a floating lever.

5. A control system as defined in claim 3 wherein said summation means includes a floating lever.

6. A control system for a gas turbine engine as claimed in claim 1 including a total fuel flow control member, spring loading means coupled with said flow control member and said manually-operable control member, feedback means responsive to adjustment in position of nozzle area, and lost motion connecting means between said total fuel flow control member and said feedback means maintaining total fuel flow adjustable only within limits determined by the lost motion and actual nozzle area.

7. A control system for a gas turbine engine as defined in claim 6 including cam means interconnecting the total fuel flow control member with said nozzle area control means such that the nozzle area control means is adjusted roughly by said total fuel flow member, said engine operating condition then causing trim of this rough adjustment in the sense to tend to maintain said engine condition constant.

8. A control system for a gas turbine engine as claimed in claim 7 wherein the cam means comprises a cam which is both rotatable and axially movable about the rotation axis, rotational drive means for said cam coupled with said total fuel flow control member, axial drive means coupled with said cam and responsive to said engine operating condition, a cam follower directly connected to said nozzle area control means, and spring means urging said cam follower against said cam.

9. A control system for a gas turbine engine as claimed in claim 8 wherein said nozzle area control means includes a feedback servo, said servo including said feedback means having a lost motion connection with said fuel flow control member.

10. A control system for a gas turbine engine as claimed in claim 1 including means for trimming the selected total fuel flow for the reheat burner assemblies in accordance with engine compressor delivery pressure.

References Cited by the Examiner

UNITED STATES PATENTS

| | | | |
|---|---|---|---|
| 2,979,889 | 4/1961 | Hurtle et al. | 60—35.6 |
| 2,987,877 | 6/1961 | Torell | 60—35.6 |
| 2,988,883 | 6/1961 | Corbett | 60—39.28 |
| 3,056,256 | 10/1962 | Torell | 60—35.6 |
| 3,095,702 | 7/1963 | Brown et al. | 60—39.28 |

JULIUS E. WEST, *Primary Examiner.*